US009147306B2

(12) United States Patent
Nicely

(10) Patent No.: US 9,147,306 B2
(45) Date of Patent: Sep. 29, 2015

(54) AWARD FREQUENCY ANALYSIS (AFA) SECURITY AUDITOR

(75) Inventor: Mark C. Nicely, Daly City, CA (US)

(73) Assignee: IGT, Las Vegas, NV (US)

( * ) Notice: Subject to any disclaimer, the term of this patent is extended or adjusted under 35 U.S.C. 154(b) by 1000 days.

(21) Appl. No.: 12/504,383

(22) Filed: Jul. 16, 2009

(65) Prior Publication Data

US 2011/0014969 A1 Jan. 20, 2011

(51) Int. Cl.
*A63F 13/00* (2014.01)
*G07F 17/32* (2006.01)

(52) U.S. Cl.
CPC ............ *G07F 17/32* (2013.01); *G07F 17/3237* (2013.01)

(58) Field of Classification Search
CPC ............ A63F 17/3237; A63F 17/3239; A63F 17/3241; A63F 17/3244
USPC .................................... 463/25, 28, 42, 40, 41
See application file for complete search history.

(56) References Cited

U.S. PATENT DOCUMENTS

| | | | | |
|---|---|---|---|---|
| 4,448,419 | A | 5/1984 | Telnaes | |
| 7,258,612 | B2 * | 8/2007 | Fujimoto | 463/29 |
| 7,585,217 | B2 * | 9/2009 | Lutnick et al. | 463/16 |
| 7,997,973 | B2 * | 8/2011 | Lutnick et al. | 463/16 |
| 2002/0107841 | A1 * | 8/2002 | Hellerstein et al. | 707/3 |
| 2005/0043086 | A1 * | 2/2005 | Schneider | 463/25 |
| 2006/0063594 | A1 | 3/2006 | Benbrahim | |
| 2006/0205489 | A1 * | 9/2006 | Carpenter et al. | 463/29 |
| 2007/0155490 | A1 * | 7/2007 | Phillips et al. | 463/29 |
| 2008/0113783 | A1 * | 5/2008 | Czyzewski et al. | 463/29 |
| 2008/0154829 | A1 * | 6/2008 | Dalton | 706/46 |
| 2010/0016067 | A1 * | 1/2010 | White et al. | 463/25 |

OTHER PUBLICATIONS

Kilby, Jim, et al. "Casino Operations Management" 2nd ed, Wiley and Sons, 2005.*

* cited by examiner

*Primary Examiner* — Ronald Laneau
*Assistant Examiner* — Ross Williams
(74) *Attorney, Agent, or Firm* — Neal, Gerber & Eisenberg LLP

(57) ABSTRACT

An award frequency analysis auditor is employed in wager based gaming systems and reduces the time necessary to detect award frequency and return to player that is out of a desired range. User configurable thresholds may be set with the auditor and user configurable actions may also be configured to be performed when the thresholds are reached. Increased accuracy and reduction of false positives are achieved.

22 Claims, 13 Drawing Sheets

| SYMBOLS | Reel 1 | Reel 2 | Reel 3 |
|---|---|---|---|
| Red7 | 1 | 1 | 1 |
| White7 | 5 | 3 | 3 |
| Blue7 | 5 | 7 | 7 |
| Blank | 11 | 11 | 11 |
| TOTAL | 22 | 22 | 22 |

| Outcome | Pays |
|---|---|
| Red7-Red7-Red7 | 200 |
| White7-White7-White7 | 50 |
| Blue7-Blue7-Blue7 | 15 |
| Any 7s | 3 |
| No win | 0 |

Game Math

| Outcome | Pays | Hit Combos | Odds | Prob. | RTP | VAR |
|---|---|---|---|---|---|---|
| Red7~Red7~Red7 | 200 | 1 | 1 : 9,361 | 0.009% | 1.88% | 3.7 |
| White7~White7~White7 | 50 | 45 | 45 : 9,362 | 0.423% | 21.13% | 10.2 |
| Blue7~Blue7~Blue7 | 15 | 245 | 245 : 9,363 | 2.301% | 34.51% | 4.5 |
| Any 7s | 3 | 1,320 | 1,320 : 9,364 | 12.397% | 37.19% | 0.5 |
| No Win | 0 | 9,037 | 9,037 : 9,365 | 84.870% | 0.00% | 0.8 |

Total RTP: 94.71%

Total Variance: 19.7

Cycle Size: 10,648

Standard Deviation: 4.4

*FIG. 7*

| | 90% Confidence Level z-score = 1.645 | | | 95.45% Confidence Level z-score = 2.000 | | |
|---|---|---|---|---|---|---|
| # Games | Inter-val | Low RTP Range | High RTP Range | Inter-val | Low RTP Range | High RTP Range |
| 100 | 73.0% | 21.67% | 167.76% | 88.8% | 5.90% | 183.52% |
| 500 | 32.7% | 62.05% | 127.38% | 39.7% | 55.00% | 134.43% |
| 1,000 | 23.1% | 71.61% | 117.81% | 28.1% | 66.63% | 122.80% |
| 5,000 | 10.3% | 84.38% | 105.04% | 12.6% | 82.15% | 107.27% |
| 10,000 | 7.3% | 87.41% | 102.02% | 8.9% | 85.83% | 103.59% |
| 50,000 | 3.3% | 91.45% | 97.98% | 4.0% | 90.74% | 98.68% |
| 100,000 | 2.3% | 92.40% | 97.02% | 2.8% | 91.90% | 97.52% |
| 500,000 | 1.0% | 93.68% | 95.75% | 1.3% | 93.46% | 95.97% |
| 1,000,000 | 0.7% | 93.98% | 95.44% | 0.9% | 93.82% | 95.60% |

FIG. 8

| Outcome | # Hits | Pay / hit | Total Paid |
|---|---|---|---|
| Red7-Red7-Red7 | 1 | 200 | 200 |
| White7-White7-White7 | 4 | 50 | 200 |
| Blue7-Blue7-Blue7 | 28 | 15 | 420 |
| Any 7s | 124 | 3 | 372 |
| No Win | 843 | 0 | 0 |
| Totals: | 1,000 | | 1,192 |

FIG. 10

| Outcome | # Hits | Pay / hit | Total Paid |
|---|---|---|---|
| Red7-Red7-Red7 | 2 | 200 | 400 |
| White7-White7-White7 | 4 | 50 | 200 |
| Blue7-Blue7-Blue7 | 28 | 15 | 420 |
| Any 7s | 124 | 3 | 372 |
| No Win | 842 | 0 | 0 |
| Totals: | 1,000 | | 1,392 |

FIG. 11

| Outcome | $1 Bet Hits | $10 Bet Hits | Total Hits | Pay / hit | $1 Bet Pays | $10 Bet Pays | Total Paid |
|---|---|---|---|---|---|---|---|
| Red7-Red7-Red7 | 0 | 1 | 1 | 200x | $0 | $2,000 | $2,000 |
| White7-White7-White7 | 3 | 0 | 4 | 50x | $150 | $0 | $150 |
| Blue7-Blue7-Blue7 | 25 | 3 | 28 | 15x | $375 | $450 | $825 |
| Any 7s | 114 | 10 | 124 | 3x | $342 | $300 | $642 |
| No Win | 758 | 86 | 843 | 0x | $0 | $0 | $0 |
| Totals: | 900 | 100 | 1,000 | | $867 | $2,750 | $3,617 |

FIG. 12

| SYMBOLS | Reel 1 | Reel 2 | Reel 3 |
|---|---|---|---|
| Red7 | 1 | 1 | 1 |
| White7 | 5 | 3 | 3 |
| Blue7 | 5 | 7 | 7 |
| Blank | 11 | 11 | 11 |
| TOTAL | 22 | 22 | 22 |

FIG. 13

| SYMBOLS | Reel 1 | Reel 2 | Reel 3 |
|---|---|---|---|
| Red7 | 1 | 1 | 1 |
| White7 | 7 | 2 | 3 |
| Blue7 | 3 | 8 | 7 |
| Blank | 11 | 11 | 11 |
| TOTAL | 22 | 22 | 22 |

FIG. 14

| Outcome | Pays | Odds | Prob. | RTP |
|---|---|---|---|---|
| Red7-Red7-Red7 | 200 | 1 : 10648 | 0.01% | 1.88% |
| White7-White7-White7 | 50 | 42 : 10648 | 0.39% | 19.72% |
| Blue7-Blue7-Blue7 | 15 | 168 : 10648 | 1.58% | 23.67% |
| Any 7s | 3 | 1320 : 10648 | 12.40% | 37.19% |
| No Win | 0 | 9117 : 10648 | 85.62% | 0.00% |
| | | | 100.00% | 82.46% |

FIG. 15

AWARD FREQUENCY ANALYSIS (AFA) SECURITY AUDITOR

BACKGROUND OF THE INVENTION

The present invention relates generally to gaming devices and systems, and more specifically to devices and systems for monitoring and ensuring the proper payback of the devices.

Casinos and other forms of gaming comprise a growing multi-billion dollar industry both domestically and abroad, with electronic and microprocessor based gaming machines being more popular than ever. A gaming entity that provides gaming services may control gaming devices that are globally distributed in many different types of establishments. For example, gaming machines may be placed in casinos, convenience stores, racetracks, supermarkets, bars and boats. Further, via a remote server, a gaming entity may provide gaming services in locale of a user's choosing, such as on a home computer or on a mobile device carried by the user.

Electronic and microprocessor based gaming machines can include various hardware and software components to provide a wide variety of game types and game playing capabilities, with such hardware and software components being generally well known in the art. For example, bill validators, coin acceptors, card readers, keypads, buttons, levers, touch screens, displays, coin hoppers, player tracking units and the like are examples of hardware that can be coupled to a gaming machine. Software components can include, for example, boot and initialization routines, various game play programs and subroutines, credit and payout routines, image and audio generation programs, security monitoring programs, authentication programs and a random number generator, among others.

The functions available on a gaming machine may depend on whether the gaming machine is linked to other gaming devices. For instance, when connected to other remote gaming devices, a gaming machine may provide progressive jackpots, player tracking and loyalty points programs, cashless gaming, and bonusing among other items. In some systems, often known as server-based gaming systems, certain data can be transmitted to the gaming machine such as denomination selection control data, game selection control and display software and data, game operation and display software and data, etc, Many of these added components, features and programs can involve the implementation of various back-end and/or networked systems, including more hardware and software elements, as is generally known.

In a typical casino-based electronic gaming machine, such as a slot machine, video poker machine, video keno machine or the like, a game play is initiated through a wager of money or credit, whereupon the gaming machine determines a game outcome, presents the game outcome to the player and then potentially dispenses an award of some type, including a monetary award, depending upon the game outcome. In this instance, the gaming machine is operable to receive, store and dispense indicia of credit or cash as well as calculate a gaming outcome that could result in a large monetary award. The gaming machine is enabled to operate in this manner because it is placed typically in a location that is monitored (e.g., a casino), the gaming machine hardware and software components are secured within a locked cabinet and the gaming machine includes a security system for detecting fraud or theft attempts.

SUMMARY OF THE INVENTION

An inter arrival award frequency analysis ("AFA") device may be incorporated into a gaming system. Such a device is used to audit the operations of a group of electronic gaming machines. Embodiments of such a device result in fewer false positives as compared to prior Return To Player ("RTP") based solutions. An embodiment of an AFA system would correctly inform a casino operator of an early cycle of a top award and present a more accurate assessment of the nature and likelihood of further losses. The reduction of false positive (payout errors) is especially effective with games having variable bet sizes.

The AFA auditing device/system, which focuses on the rate of occurrence of events irrespective of the bet size, avoids the inherent difficulties that RTP-based auditing systems have with variable bet sizes.

Another advantage is earlier problem detection, as compared to prior RTP based solutions. An AFA system according to the present invention would identify a game not operating to paymodel expectations or one utilizing an improper paymodel for auditing purposes.

One aspect relates to an electronic wager based gaming control device. The device comprises: a microprocessor; a memory storage device; a user input device; and a network connection. The gaming control device is configured by instructions stored in the memory storage device when executed by the microprocessor to: receive and calculate statistical data relating to Return To Player of a plurality of electronic gaming machines coupled to the gaming control device, receive input from a user specifying a confidence interval threshold limit for one or more of the plurality of electronic gaming machines; receive user input specifying an action to perform if the confidence interval threshold is met or exceeded; perform an inter-arrival award frequency analysis on the data on return to player; compare the results of the award frequency analysis with the statistical data and determine if the confidence limit threshold has been met or exceeded; and perform the user specified action.

Another aspect relates to an electronic wager based gaming control device that is configured to: receive input from a user specifying a group of award variables to analyze; receive input from a user specifying an alarm setting for selected of the variables, the alarm setting comprising a multi part condition for tripping the alarm, the multi part condition specifying at least a first condition for a first of variables and a second condition for a second of the variables. The device is further configured to compare the results of the award frequency analysis to the alarm setting and determine if each of the conditions of the multi part analysis are met; and if so determined indicate an alarm condition to the user or another casino system.

Yet another aspect relates to an electronic wager based gaming control device that is configured to: collect statistical data on Return To Player of a plurality of electronic gaming machines coupled to the gaming control device; employ an auditing paymodel in an award frequency analysis utilizing the collected statistical data; and determine if a paymodel for a game running on an electronic gaming machine of the plurality is different than the auditing paymodel.

BRIEF DESCRIPTION OF THE DRAWINGS

FIGS. 4-9 depict an exemplary three reel game.

FIGS. 10-16 illustrate some advantages of AFA usage.

Figure 1A:
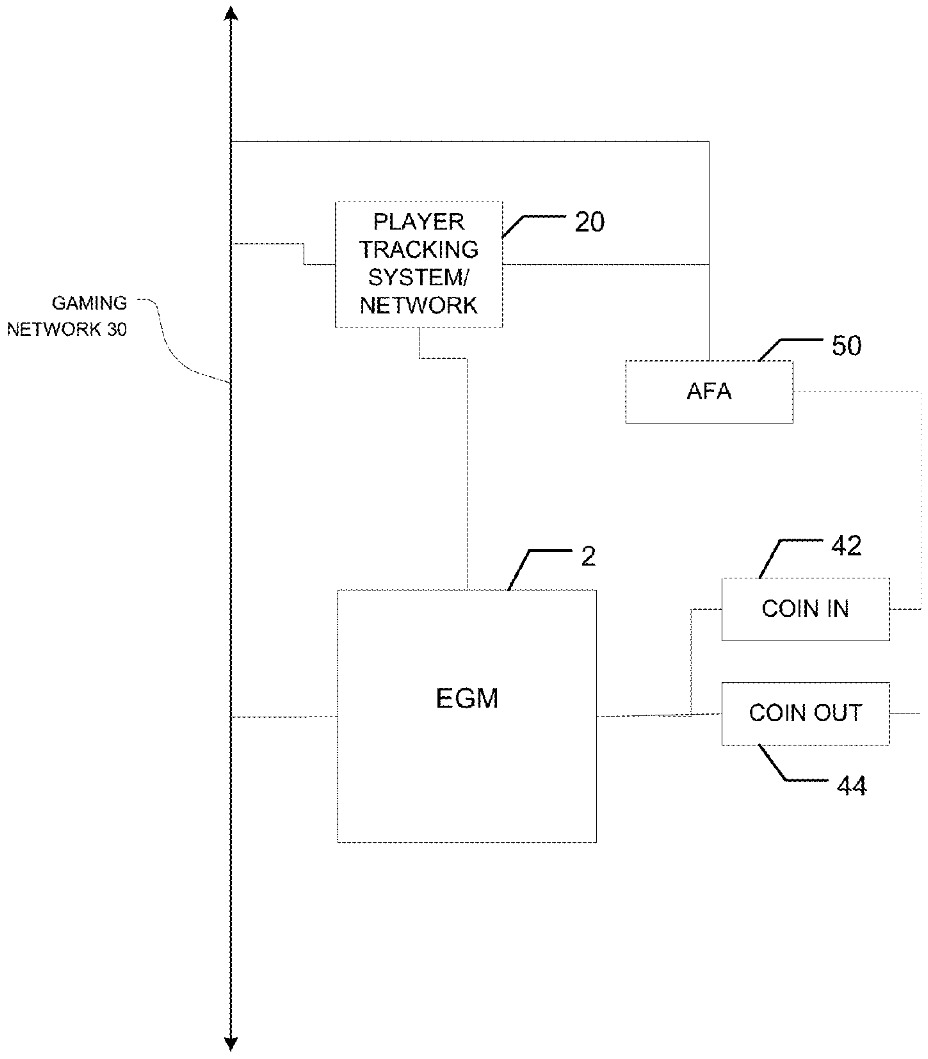
FIG. 1A is a block diagrams illustrating a system incorporating an award frequency analysis ("AFA") device or system.

A further understanding of the nature and advantages of the present invention may be realized by reference to the remaining portions of the specification and the drawings.

DETAILED DESCRIPTION OF THE PREFERRED EMBODIMENTS

Exemplary applications of systems and methods according to the present invention are described in this section. These examples are being provided solely to add context and aid in the understanding of the present invention. It will thus be apparent to one skilled in the art that the invention may be practiced without some or all of these specific details. In other instances, well known process steps have not been described in detail in order to avoid unnecessarily obscuring the present invention. Other applications are possible, such that the following example should not be taken as definitive or limiting either in scope or setting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

In the following figures, method and apparatus applicable to various gaming system configurations and their associated components are described. The gaming systems may comprise a network infrastructure for enabling one or more hosts to communicate with gaming machines. The gaming machines may be operable to provide wagering on a game of chance. A plurality of gaming devices, such as bill/ticket validators, printers, mechanical displays, video displays, coin hoppers, light panels, input buttons, touch screens, key pads, card readers, audio output devices, etc., may be coupled to the gaming machine. The gaming devices may be controlled by a master gaming controller executing authenticated software to provide a gaming interface for a game play experience on the gaming machine.

Casino Gaming Parameters and Metrics

Gaming software often contains one or more data structures that specify game-specific parameters of a given game, such as the definition of winning patterns and their corresponding award value. In certain games, like slot games, game-specific parameters can also specify composition and frequency of gaming elements, such as the order and frequency of the symbols on each reel. Many game-specific parameters impact the expected profitability of a given casino game. Many casino game providers develop multiple versions of a given game, where all of the versions appear to be the same to player, but because of differences in the game-specific parameter, the average expected payback to player varies between the versions.

Many casino-based electronic gaming machines have devices or mechanism to keep track of certain metrics. In some gaming jurisdictions, every gaming machine of a certain class or category is required to maintain and report specific metrics. For example, in at least one jurisdiction, gaming machine metrics to be tracked include, amongst others, the total number of credits wagered "Coin In" and the total number of credits awarded "Coin Out". In some gaming devices, the required meters are implemented as physical counters. In some gaming devices, the required meters are alternately or additionally implemented as computer-based counters using non-volatile data storages.

Many casino-based electronic gaming machines can communicate via a network or other electronic means, with a central casino server. The information that can be communicated can include gaming machine metrics such as Coin In, Coin Out, number of game played, as well as many other metrics and many other types of information. Casino operators can use such networked information for many purposes, such as identifying which gaming machines are more popular and which are less profitable. Casino operators can use such networked information to identify potentially abnormal gaming machine behavior, whether caused by machine malfunction, or by incorrect game-specific parameters, or by machine tampering, or by natural occurrence of rare circumstances.

One method that very many casino operators use to judge correctness of machine behavior is to observe and track machine profitability. A metric frequently used in the casino industry to quantitatively describe gaming-machine profitability is known by terms such as "Win Percent", "Win %" , "Hold Percent", or "Hold %" or it's compliment representation known as terms such as "Return to Player", or "RTP", or "payback percent". In the casino industry, Return To Player, or RTP represents the ratio of Coin Out to Coin In. Specifically, RTP=Coin Out/Coin In. Similarly, the complimentary value, Hold Percent or Hold % is the compliment of RTP, namely, Hold %=100%−RTP, which can also be represented as:

$$\text{Hold }\%=100\%-(\text{Coin Out}/\text{Coin In})$$

or as $$\text{Hold }\%=(\text{Coin In}/\text{Coin In})-(\text{Coin Out}/\text{Coin In})=(\text{Coin In}-\text{Coin Out})/\text{Coin In}.$$

The actual RTP for a given gaming machine is typically not considered to be within normal expectations if it falls outside of a confidence interval relative to the confidence level established by a given casino. The details of confidence interval testing for RTP are presented in detail later in this document.

Example Casino System Architecture

Figure 2:
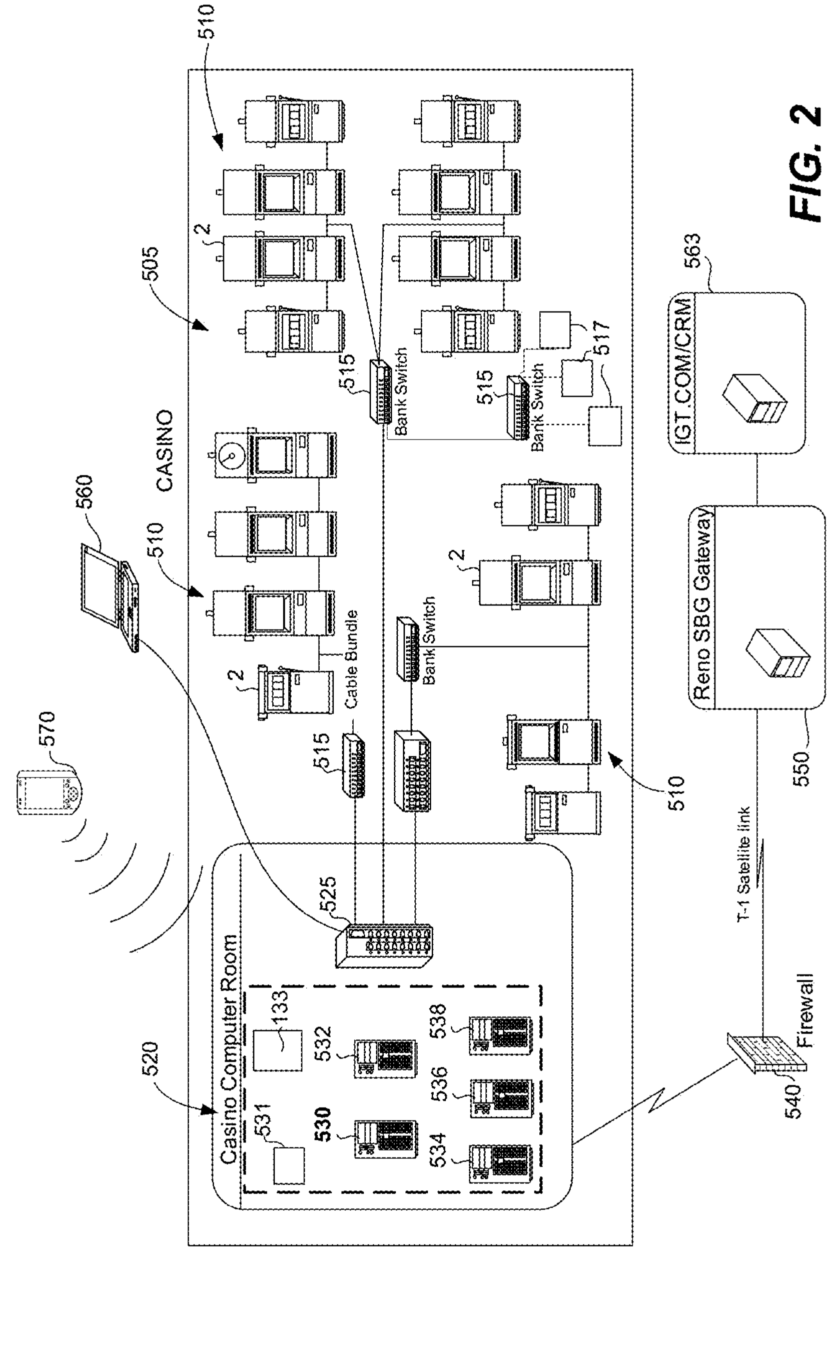
FIG. 2 illustrates a block diagram of a casino in which award frequency analysis is useful.

One example of a network topology for implementing some aspects of the present invention is shown in FIG. 2. Those of skill in the art will realize that this exemplary architecture and the related functionality are merely examples and that the present invention encompasses many other such embodiments and methods. Here, for example, a single gaming establishment 505 is illustrated, which is a casino in this example. However, it should be understood that some implementations of the present invention involve multiple gaming establishments.

Gaming establishment 505 includes 16 gaming machines 2, each of which is part of a bank 510 of gaming machines 2. In this example, gaming establishment 505 also includes a bank of networked gaming tables 517. It will be appreciated that many gaming establishments include hundreds or even thousands of gaming machines 2 and/or gaming tables 517, not all of which are included in a bank. However, the present invention may be implemented in gaming establishments having any number of gaming machines, gaming tables, etc.

Various alternative network topologies can be used to implement different aspects of the invention and/or to accommodate varying numbers of networked devices. For example, gaming establishments with very large numbers of gaming machines 2 may require multiple instances of some network devices (e.g., of main network device 525, which combines switching and routing functionality in this example) and/or the inclusion of other network devices not shown in FIG. 2. For example, some implementations of the invention include one or more middleware servers disposed between gaming machines 2 and server 530. Such middleware servers can provide various useful functions, including but not limited to the filtering and/or aggregation of data received from bank switches 515, from individual gaming machines and from other player terminals. Some implementations of the invention include load balancing methods and devices for managing network traffic.

Each bank 510 has a corresponding bank switch 515, which may be a conventional bank switch. Each bank switch is connected to server-based gaming ("SBG") server 530 via main network device 525, which combines switching and routing functionality in this example.

Although various floor communication protocols may be used, some preferred implementations use the Game to System or "G2S" protocol. The GS2 protocol combines features of IGT's open, Ethernet-based SuperSAS® protocol and the Best of Breed ("BOB") protocol, either of which may also be used to implement various aspects of SBG. IGT has also developed a gaming-industry-specific transport layer called CASH that rides on top of TCP/IP and offers additional functionality and security.

SBG server 530, License Manager 531, Arbiter 133, servers 532, 534, 536 and 538, and main network device 525 are disposed within computer room 520 of gaming establishment 505. In practice, more or fewer servers may be used. Some of these servers may be configured to perform tasks relating to player loyalty and/or player tracking, bonusing/progressives, etc. Some servers may be configured to perform tasks specific to the present invention. License Manager 531 may also be implemented, at least in part, via a server or a similar device.

SBG server 530 can also be configured to implement, at least in part, various aspects of the present invention. Some preferred embodiments of SBG server 530 and the other servers shown in FIG. 2 include (or are at least in communication with) clustered CPUs, redundant storage devices, including backup storage devices, switches, etc. Such storage devices may include a redundant array of inexpensive disks ("RAID"), back-up hard drives and/or tape drives, etc. Preferably, a Radius and a DHCP server are also configured for communication with the gaming network. Some implementations of the invention provide one or more of these servers in the form of blade servers.

In some implementations of the invention, many of these devices (including but not limited to License Manager 531, servers 532, 534, 536 and 538, and main network device 525) are mounted in a single rack with SBG server 530. Accordingly, many or all such devices will sometimes be referenced in the aggregate as an "SBG server." However, in alternative implementations, one or more of these devices is in communication with SBG server 530 and/or other devices of the network but located elsewhere. For example, some of the devices could be mounted in separate racks within computer room 520 or located elsewhere on the network. For example, it can be advantageous to store large volumes of data elsewhere via a storage area network ("SAN").

In some embodiments, these components are SBG server 530 preferably has an uninterruptible power supply ("UPS"). The UPS may be, for example, a rack-mounted UPS module.

Computer room 520 may include one or more operator consoles or other host devices that are configured for communication with SBG server 530. Such host devices may be provided with software, hardware and/or firmware for implementing various aspects of the invention; many of these aspects involve controlling SBG server 530. However, such host devices need not be located within computer room 520. Wired host device 560 (which is a laptop computer in this example) and wireless host device 570 (which is a PDA in this example) may be located elsewhere in gaming establishment 505 or at a remote location. Accordingly, one or more devices in casino 505 may be configured for communication with locations not limited to those indicated in FIG. 2, e.g., via the Internet or another convenient network.

Arbiter 133 may be implemented, for example, via software that is running on a server or another networked device. Arbiter 133 serves as an intermediary between different devices on the network. Some implementations of Arbiter 133 are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference in the entirety. In some preferred implementations, Arbiter 133 is a repository for the configuration information required for communication between devices on the gaming network (and, in some implementations, devices outside the gaming network).

Figure 1B:
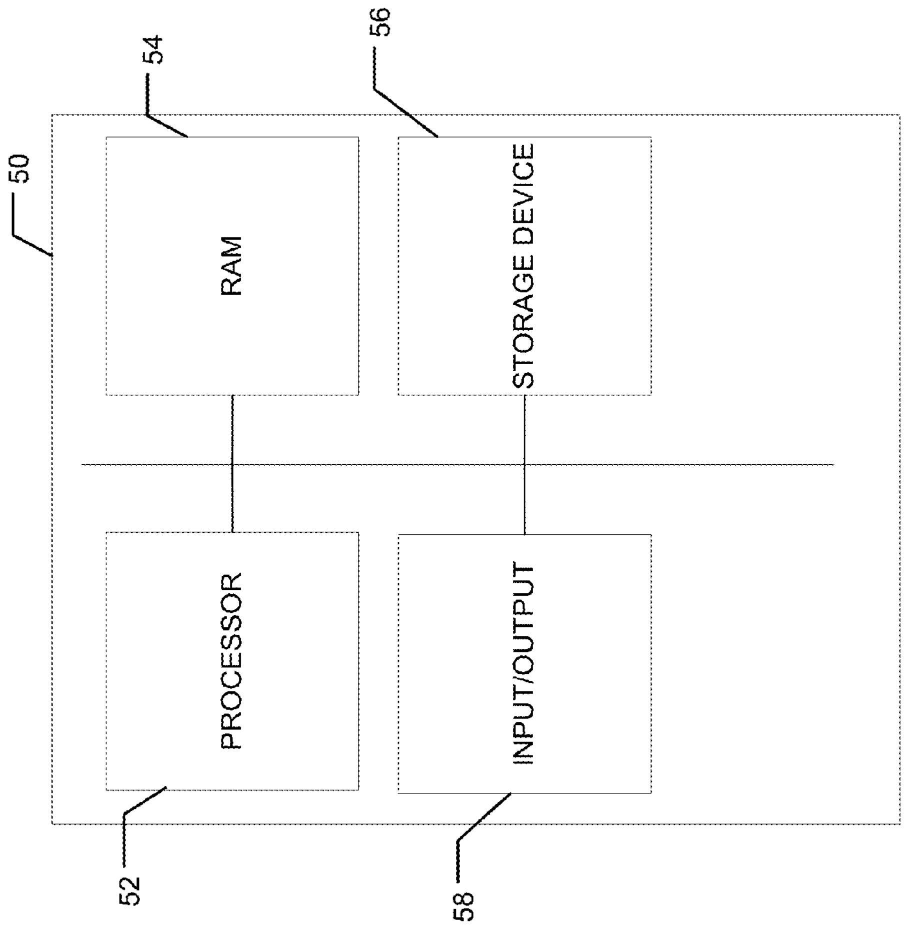
FIG. 1B is a block diagram of an embodiment of an AFA device.

FIG. 1A is a block diagram illustrating a system incorporating an award frequency analysis AFA device or system. AFA device 50 is coupled to gaming network 30 and a player tracking system/network 20. It should be noted that AFA can be implemented without a connection to a player tracking system/network and AFA can be implemented in a system which has no player tracking system or player tracking system network. AFA device 50 may also be coupled to a Coin In meter 42 and Coin Out meter 44 at each EGM. In an alternate embodiment, AFA connects directly to the gaming machine, and the gaming machine maintains and reports Coin In and Coin Out meter data. In yet another embodiment where the AFA connects directly to the gaming machine, the gaming machine maintains and reports data other than Coin In and Coin Out meter data instead of or in addition to Coin In and Coin Out meter data. The gaming network 30 is coupled to a plurality of electronic gaming machines, one of which, gaming machine 2, is shown. Coin In meter 42 and Coin Out meter 44 are shown as discrete devices, which is often the case in many gaming environments, although in many environments the meters may be integrated into the EGM, and may be software based. Often legacy Coin In or out meters are physical pieces of hardware that can be integrated with machines from many manufacturers and can keep track of and transmit the total number of coins put in and paid out into a machine. In cashless gaming systems, the meters may still be present to transmit the equivalent number of credits taken in and paid out. As shown in FIG. 1B, in a preferred embodiment AFA device 50 comprises a microprocessor, a random access memory 54, and a non volatile code storage device 56. In one embodiment the AFA device 50 is implemented for use in a rack or in a backplane of a larger computing system. In one embodiment the device is AFA specifically designed hardware and the processor is an ASIC or FPGA specially tailored to compute the large amount of statistic data in real time required for AFA analysis, which will be described some examples below. In another embodiment the AFA functionality may be incorporated into a driver for use in another machine, for example in an EGM, and the AFA settings and computations may be performed by the hardware of that machine. In another example, the AFA functionality may be incorporated into a ROM accessed by another machine. The AFA device 50 may also comprise or be coupled to input/output devices including a monitor, keyboard, mouse, and printer etc.

Example illustrations of award frequency analysis ("AFA") as compared to RTP.

A simplified slot game can be used to demonstrate the functionality and advantages of embodiments of the invention. Table 1 below, reproduced as FIG. 4 indicates the relative frequency of symbols on each reel of a three reel game.

TABLE 1

| SYMBOLS | Reel 1 | Reel 2 | Reel 3 |
|---|---|---|---|
| Red7 | 1 | 1 | 1 |
| White7 | 5 | 3 | 3 |
| Blue7 | 5 | 7 | 7 |
| Blank | 11 | 11 | 11 |
| TOTAL | 22 | 22 | 22 |

TABLE 2

| Outcome | Pays |
|---|---|
| Red7-Red7-Red7 | 200 |
| White7-White7-White7 | 50 |
| Blue7-Blue7-Blue7 | 15 |
| Any 7s | 3 |
| No Win | 0 |

As is typical for most mechanical, electro-mechanical and computer-based slot games, in the case where a given outcome matches two or more win conditions listed on the paytable, only the highest paying outcome is paid. For example, an outcome resulting in a Blue7 symbol on each reel positions along the payline, only the 15 credit award listed for Blue7-Blue7-Blue7 is paid; the lesser pay for an "Any 7s" outcome is not paid.

The expected mathematical behavior for this example game can be expressed as seen below in Table 3, reproduced as FIG. 7.

TABLE 3

| Game Math | | | | | | |
|---|---|---|---|---|---|---|
| Outcome | Pays | Hit Combos | Odds | Prob. | RTP | VAR |
| Red7-Red7-Red7 | 200 | 1 | 1:9,261 | 0.009% | 1.88% | 3.7 |
| White7-White7-White7 | 50 | 45 | 45:9,262 | 0.423% | 21.13% | 10.2 |
| Blue7-Blue7-Blue7 | 15 | 245 | 245:9,263 | 2.301% | 34.51% | 4.5 |
| Any 7s | 3 | 1,320 | 1,320:9,264 | 12.397% | 37.19% | 0.5 |
| No win | 0 | 9.037 | 9,037:9.265 | 34.870% | 0.00% | 0.8 |
| | | | | Total RTP: 94.71% | | |
| | | | | Total variance: 19.7 | | |
| cycle Size: 10,648 | | | | Standard Deviation: 4.4 | | |

As is typical for a properly functioning electro-mechanical slot machine, (or for a computer representation thereof) for each game, each reel independently spins and stops on one of 22 positions, each position indicated by either a distinct symbol or a blank or absent symbol. In this example, the specific ending position of any given reel is equi-probable, with uniform probability=1/22. (Note that in most modern electro-mechanical slot machines, the ending position probabilities are not equi-probable, as described in U.S. Pat. No. 4,448,419.)

Figures 4, 5, 6:
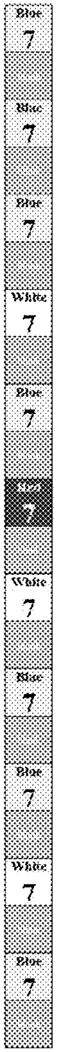

Though this has no bearing on the following math, one possible layout of symbols on the reel strip associated with Reel 2 is shown in FIG. 5. The payout math remains the same irrespective of reel strip arrangement.

As is typical for a properly functioning non-electronic slot machine, (or for a computer representation thereof) for each game, the game outcome is based upon the symbol in one particular orientation from one or more reels, typically along a demarcation known as a payline. For this example, the following paytable in Table 2 below (reproduced as FIG. 6) is used to define what outcome are to result in award pays to the player, with all other outcome resulting in no such pays.

Pays indicates the amount of paid to the player for a winning outcome relative to the players wager. If the player bets $5 and gets the winning outcome White7-White7-White7, the player will be paid 50×$5=$250.

Hit Combos indicates the number of ways a given outcome can occur. For most winning outcomes, Hit Combos is the product of the number of the required symbol from each reel. For example, for White7-White7-White7, there are 5, 3 and 3 White 7 symbols, respectively, on Reel 1, Reel 2 and Reel 3. Therefore, the number of Hit Combos for White7-White7-White7 is 5*3*3=45. For an outcome like Any 7s a subset of which comprises higher paying winning outcomes, the Hit Combos is the product of the total number of 7's on each reel, 11*11*11, minus the respective Hit Combo for each of the three composite outcomes, Red7-Red7-Red7, White7-White7-White7, Blue7-Blue7-Blue7 which is 1, 27 and 216, respectively. Therefore, the Hit Combos for Any 7s is (11*11*11)−(1+45+245)=1320.

Cycle Size indicates the number of all possible outcomes, winning or otherwise, and is calculated as the product of the number of symbol outcomes from each reel. For this example, Cycle Size is 22*22*22=10648.

Prob. stands for "probability" and indicates the probability of occurrence for each of the outcomes. For a given outcome, such as White7-White7-White7, the probability of occurrence is easily calculated as the Hit Combos divided by Cycle Size: 45/10648=0.423%. In other words, the probability of occurrence is the number of ways to get a given outcome divided by total number of ways to get all outcomes.

RTP is an acronym for Return To Player and indicates the average expected percentage of player wager amounts returned or paid to players. RTP is also known in the gambling industry as payback or payback percent or payout percent. As listed on each row in the Game Math table, the RTP value represents the Return To Player from that corresponding outcome.

Game RTP indicates the Return To Player for the overall game. With each of the outcomes mutually exclusive from all other outcomes, Game RTP is the sum of the RTP values for each of the individual winning outcomes.

Game RTP represents the long-term expected ratio of all awards paid to all wagers placed. The actual RTP, whether for a specific outcome or for the entire game, can vary drastically over any normal player session. It is only after the wagers and pays from a great many play session of a great many players are accumulated, does the actual aggregate Game RTP tend towards the long-term expected Game RTP.

To characterize the expected range of actual Game RTP relative to the long-term expected Game RTP, standard statistical techniques are used.

Var is short for statistical quantity of variance of the mean which is sometimes represented as sigma squared or "$\sigma^2$". In the Game Math table, the Var values represent the expected variance of the mean of RTP. By definition, this statistic is calculated as follows:

$$Var=(\text{Actual\_Mean}-\text{Expected\_Mean})^{2*Probability}\text{\_of\_Occurence}.$$

For the Game Math table, the Expected_Mean is the expected Game RTP.

So the Var for White7-White7-White7, for example, is:

$$(50-94.71\%)2*0.423\%=10.2$$

Total Variance is the sum of the Var values of all outcomes. This also includes the Var value contribution of a non-winning outcome.

Standard Deviation, by definition, is the square root of Total Variance and is sometimes represented as SD or sigma or "$\sigma$".

The normal expected range of Game RTP after a given number of trials is typically calculated using a confidence interval, as expressed by this equation $$\text{Interval}=z*SD/sqrt(n)$$

Where:

Interval is the variation above and below the expected mean which, on average, the specified number of normal results are expected to occur.

z is the "z-score" which represents the specificity of the interval in terms of standard deviation.

SD is the Standard Deviation discussed above sqrt is the square root function n is the number of games in the sample In statistics, a z-score of 1.945 defines a range which covers 90% of expected normal outcomes. This is usually referred to as a 90% confidence interval. This is the tightest range typically used within the gaming industry for representing expected behavior. However, a confidence interval based on a 90% confidence level will, on average, define a range within which only 90% of normal events will fall. Therefore, even with a properly functioning system, about 10% of the outcomes will fall outside this range: 5% being above and 5% below.

As a standard for attempting to identify or verify an improperly functioning system, a wider interval is often used to reduce the incidence of false positives. A z-score of 2.0 implies a range covering two standard deviations and represents a 95.45% confidence interval. The probability of a normal outcome being higher than this range is (100%-95.45%)/2=2.28%. A z-score of 3.0 implies a range covering three standard deviations and represents a 99.73% confidence interval. The probability of a normal outcome being higher than this range is (100%−99.73%)/2=0.14%. This is typically the most extreme range used for specifying normal vs. abnormal behavior.

Table 4 below, reproduced as FIG. 8 shows some sample high and low RTP ranges for our example game.

TABLE 4

| | 90% Confidence Level z-score = 1.645 | | | 95.45% Confidence Level z-score = 2.000 | | |
|---|---|---|---|---|---|---|
| # Games | Interval | Low RTP Range | High RTP Range | Interval | Low RTP Range | High RTP Range |
| 100 | 73.0% | 21.67% | 167.76% | 88.8% | 5.90% | 183.52% |
| 500 | 32.7% | 62.05% | 127.38% | 39.7% | 55.00% | 134.43% |
| 1,000 | 23.1% | 71.61% | 117.81% | 28.1% | 66.63% | 122.80% |
| 5,000 | 10.3% | 84.38% | 105.04% | 12.6% | 82.15% | 107.27% |
| 10,000 | 7.3% | 87.41% | 102.02% | 8.9% | 85.83% | 103.59% |
| 50,000 | 3.3% | 91.45% | 97.98% | 4.0% | 90.74% | 98.68% |
| 100,000 | 2.3% | 92.40% | 97.02% | 2.8% | 91.90% | 97.52% |
| 500,000 | 1.0% | 93.68% | 95.75% | 1.3% | 93.46% | 95.97% |
| 1,000,000 | 0.7% | 93.98% | 95.44% | 0.9% | 93.82% | 95.60% |

Figure 9:
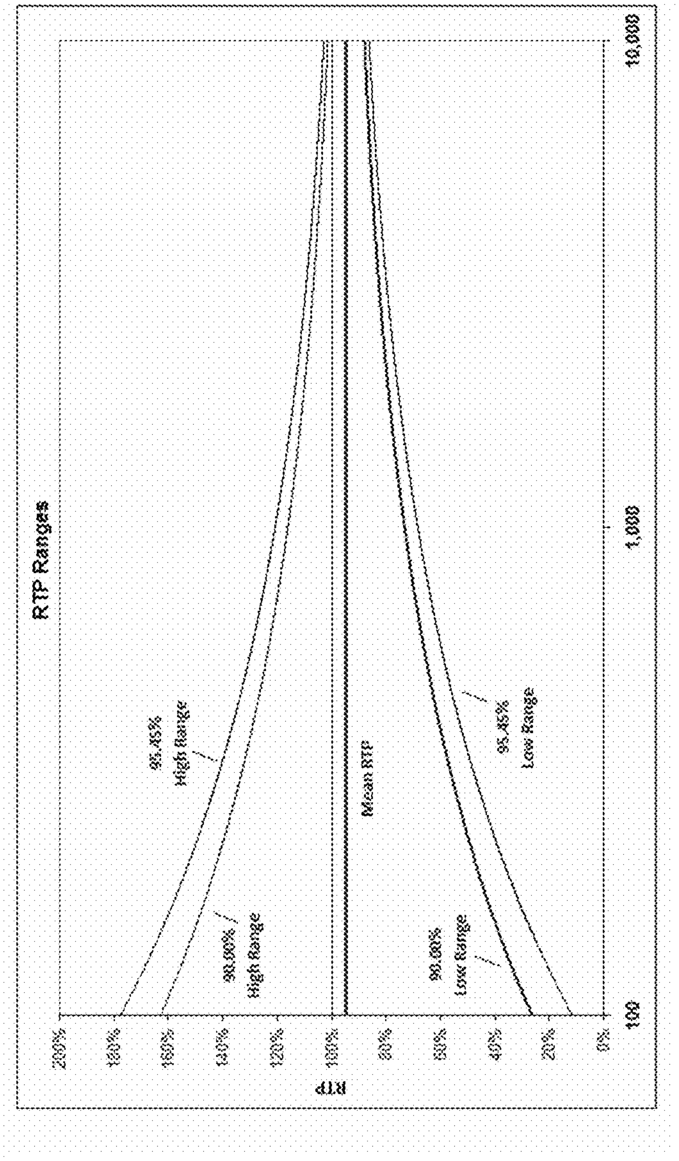

The graph of FIG. 9 shows the data in curve form. The thick horizontal line represents the mean (or expected long term) game RTP. The thin horizontal line just above the thick horizontal line represents the 100% RTP point, also known as the break-even point. The highest and lowest curves represent the high and low range of RTP values within a 95.45% Confidence Level range. The next closer curves to the horizontal lines represent the high and low range of RTP values within a 95.45% Confidence Level range. The x-axis is shown using a logarithmic scale.

As can be see both from the data chart and from the graph, even after 10,000 games, the total game RTP of a properly functioning game can still be above 100%, meaning the game has paid out more than it has taken in at that point. As can be seen in the data chart, there would need to be at least 500,000 games played before the edge of the tighter confidence interval comes within 1% of the mean value.

AFA Technique:

Auditing was previously accomplished by examining aggregate Return To Player once a large population has been collected. However, this approach makes it difficult to differentiate between normal (a few big awards) and abnormal operation without either a large population of data collected over a relatively long time, or a manual analysis of award payout history for the specific game/machine.

Inter-arrival time analysis or auditing can provide meaningful warnings right away without requiring a large population of data to be collected beforehand. Inter-arrival analysis is performed after each play of a game, for example after each pull of a slot machine etc. This will detect a problem with a specific award even much more rapidly than conventional analysis. With an inter-arrival analysis, the number of plays between a specific award is detected. This requires that not only must the Coin In vs. Coin Out be tracked, but that each game (payout line of a payout table) must be tracked. In other words, awards are tracked on a per payline basis. This also means that the award multiplier should be taken into account. Then the AFA is performed on a per payline basis. This determines whether the frequency of occurrence of each award is within expectations. Embodiments are able to track both instantaneous and life-time statistics.

Figure 3A:
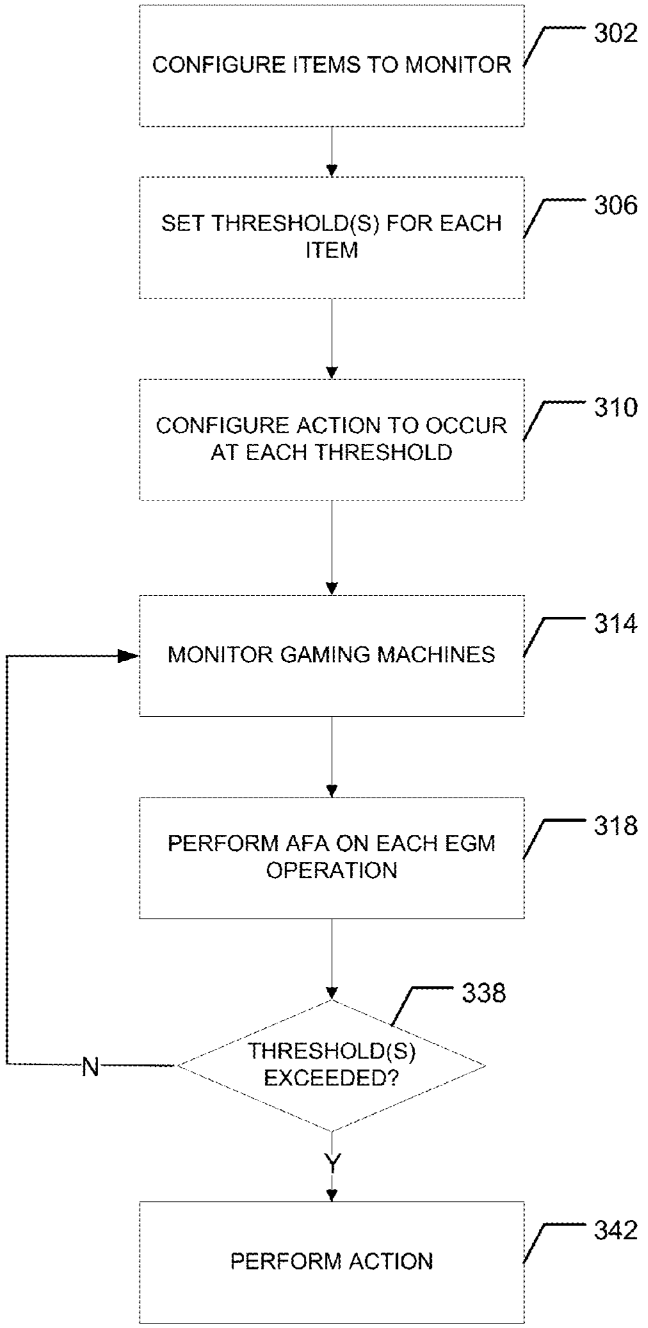
FIG. 3A is a flow chart depicting a process according to an embodiment of the invention.

FIG. 3A is a flow chart illustrating an embodiment of the invention. In step 302 a casino operator configures items to monitor at each of the gaming machines. This may be done on an individual basis or for banks or entire floors of machines. Many different items relating to awards and payback may be monitored, such as counts, histograms, averages and/or time-stamped histories of games played including denomination, bet size, which can include number of paylines activated and bet size per payline, award size which can include total awards and/or awards per each payline, bonus events triggered, bonus awards paid, progressive awards paid, etc. Such monitored data can be subjected to assorted statistical data manipulation and calculation such as cumulative average, moving average or rolling average, measured standard deviation, etc. Monitored and/or calculated data can likewise be subjected to assorted statistical testing such as, confidence interval testing, a chi squared analysis, and a t-test analysis etc. In certain systems, such data calculation and statistical tests are performed by the gaming machine CPU and in such systems, with certain embodiments of this invention, said gaming machines report the results of said calculations and/or tests to AFA.

In step 306, the operator may set one or more thresholds for each item to be monitored. Next, in step 310, the operator configures an action to occur at each specified threshold. In step 314, the system monitors the gaming machines. Note that the thresholds may be adjusted at any time during normal operation and monitoring. In step 318, the system then performs award frequency analysis ("AFA") on each gaming machine operation. In other words, the system monitors each individual play and the payback made by a machine, if any, for each play. The AFA of step 318 is further described with regard to FIG. 3C. In step 338, the system monitors whether any of the specified thresholds have been exceeded. For any threshold that has been exceeded (whether an upper limit is reached or exceeded, or a lower limit has been surpassed e.g. a payout is less than a specified lower limit) the specified action or series of actions will be performed.

In some embodiments the operator directly specifies test thresholds such as the z-score for a confidence interval and/or such as chi-square test threshold probability. In some embodiments, the operator directly specifies the sensitivity threshold for one type of test and AFA automatically determine thresholds for different tests. For example, in one AFA embodiment, the operator selects from three different confidence levels, 90%, 95% and 99% to establish a confidence interval test threshold. In such an embodiment, AFA would automatically establish a chi-square probability threshold of 5.0% or 2.5% or 0.5%, respectively based upon an operator selection of 90% or 95% or 99% for the confidence interval threshold confidence level. In some embodiments, not shown, the operator specifies a general level of test sensitivity. For example, in one variation, the operator selects from different risk sensitivities represented as "moderate sensitivity," "high sensitivity," or "very high sensitivity." Said selection would automatically cause the AFA system to correspondingly select from pre-established thresholds, such as confidence levels of 90% or 95% or 99% as the confidence interval test threshold, for each AFA test. In another variation, the operator indicates test sensitivity via other indicators such as, for example, a number between 1 (very low) to 10 (very high), or such as from a color scale from blue-end of a color spectrum (low) to the red-end of a color spectrum (high).

In some embodiments the operator establishes value thresholds for differencing test sensitivities. AFA applies a different test sensitivity for values at or above the specified threshold value than the test sensitivity for values below the specified threshold. In some variations, the threshold value established by the operator is an award multiplier. In some variations, the threshold value established by the operator is an award amount in credits. In some variations, the threshold value established by the operator is an award amount expressed in momentary units. In some variations, the threshold value established by the operator is an award amount expressed as momentary value. In some variations, the threshold value established by the operator is an award amount expressed as an award type such as an award resulting in a hand-pay. In some variations, the threshold value established by the operator is a game denomination value. In some variations, the threshold value established by the operator is a wager amount expressed in credits. In some variations, the threshold value established by the operator is a wager amount expressed in monetary units. In some embodiments, the AFA automatically adjusts threshold settings relative to other inputs such as global business rules regarding maximum number of alarms per unit time or such as AFA observing actions taken by system operators in order for AFA to develop heuristic rules for more efficient reporting.

Figure 3B:
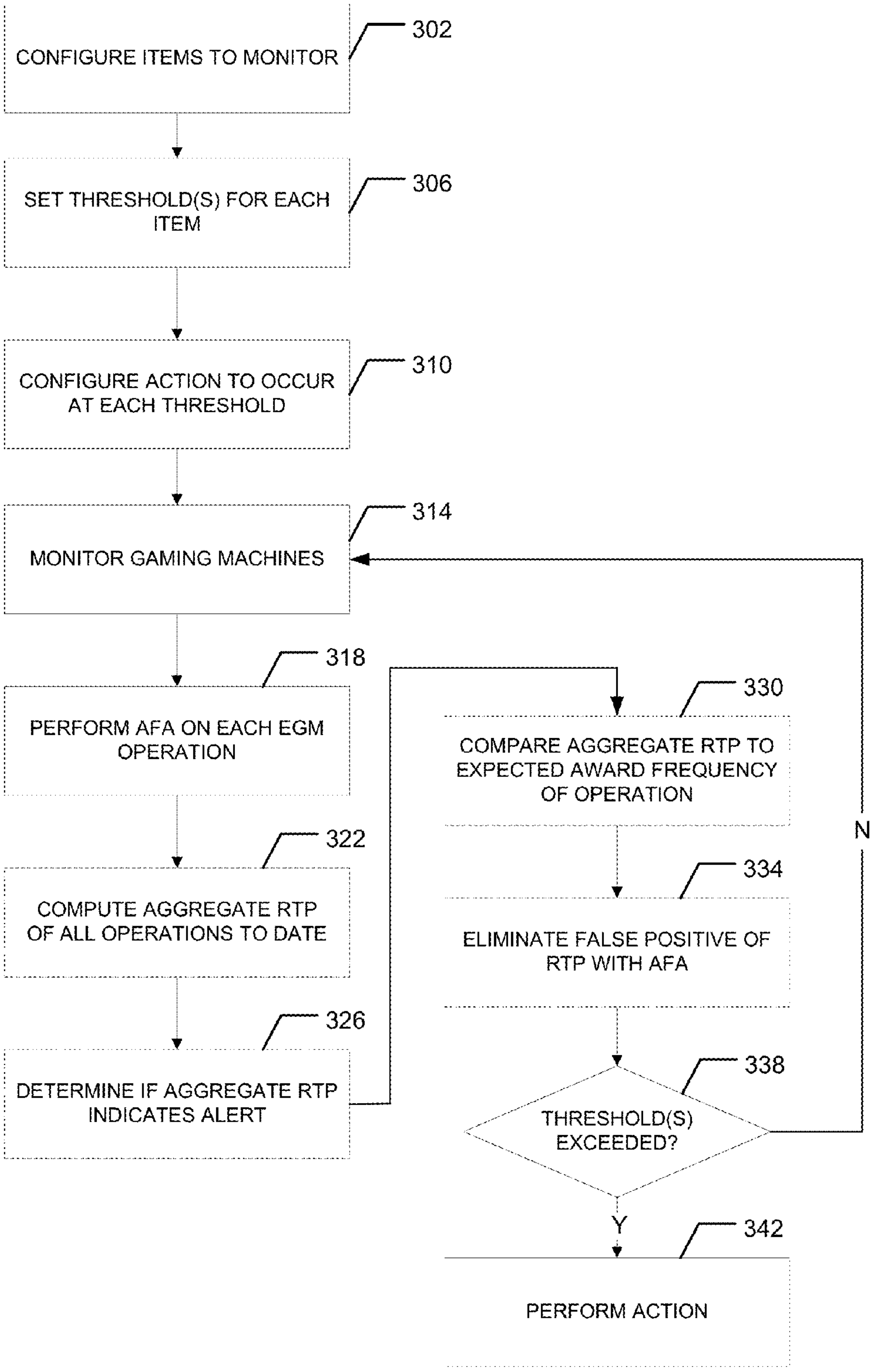
FIG. 3B is a flow chart depicting a process according to another embodiment of the invention.

FIG. 3B illustrates a similar process with some additional steps, according to another embodiment. Description of previously described steps will be omitted. Before or after the award frequency analysis is performed in step 318, the system will also compute the aggregate RTP of all operations to date for each gaming machine. This may also be done for groups of gaming machines if a group comparison is desired. In step 326, the system will optionally determine if the aggregate RTP indicates an alert. In step 330, the system will compare the aggregate RTP to the expected award frequency from step(s) 318. In step 334, if the comparison indicates a false positive (indication from the aggregate RTP) is present from the comparison it would indicate this to the operator or alternatively eliminate any alarm that may be triggered by the aggregate RTP calculations.

Figure 3C:
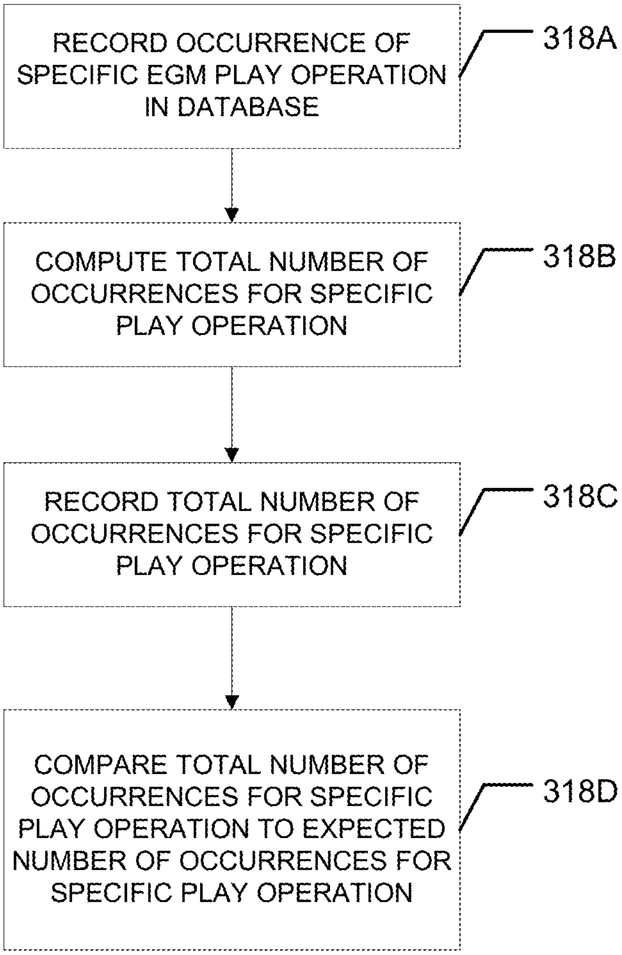
FIG. 3C is a flowchart illustrating an embodiment of step 318 in FIGS. 3A and 3B.

FIG. 3C illustrates step 318 of FIGS. 3A and 3B. In step 318A the system will record each an award (or lack thereof) associated with each game play in a database. In other words, each and every play on a slot machine or other electronically monitorable game of chance connected to the network will be monitored and specific and/or summary result data recorded in a database. In step 318, the system will compute the total number of occurrences of a specific game play operation for a given EGM. For example, if a red7-red7-red7 is the last outcome on a specific gaming machine, but there were previously two of the same outcomes in a given recording period, the system computes that there are now 3 such outcomes for the given machine. The total number of occurrences for the specified period is then recorded in step 318C. In step 318D, the system then compares the total number of occurrences for the specific gameplay operation (e.g. red7-red7-red7) to the expected number of occurrences that specific play operation. This may be accomplished by referencing a stored payback table or par sheet for the particular game.

Reduced False Positives

For our example game, lets say that the following outcomes in Table 5, Example Result set 1 (reproduced as FIG. 10), occurred during the first 1,000 games:

TABLE 5

Example Result Set 1

| Outcome | # Hits | Pay/hit | Total Paid |
|---|---|---|---|
| Red7-Red7-Red7 | 1 | 200 | 200 |
| White7-White7-White7 | 4 | 50 | 200 |
| Blue7-Blue7-Blue7 | 28 | 15 | 420 |
| Any 7s | 124 | 3 | 372 |
| No Win | 843 | 0 | 0 |
| Totals: | 1,000 | | 1,192 |

Out of 1000 games, 157 games resulted in winning outcomes and 843 games resulted in non-winning outcomes. Assuming that every game had the same wager amount, say $1, the total wagers=1000 games*$1=$1000 and the total awards=$1192 as shown in the chart above.

The game RTP at this point is:

total pays/total wagers=$1192/$1000=119.2%

The game has paid out more money than it has taken in though as can be seen in the earlier RTP range chart, the expected RTP range of this game after only 1000 games is quite wide: 66.63% to 122.80% according to the 95.45% confidence level range associated with two standard deviations. The 119.2% actual RTP is within this range so we have no statistical evidence at this point to be able to rule out abnormal game behavior.

Now what if instead of a single Red7-Red7-Red7 outcome within the first 1000 games, there had been two of these top awards? As Table 6, Example Result Set 2 (reproduced as FIG. 11), indicates, this results in a total payout of $1392 which means the game RTP at this point is $1392/$1000=139.2% which clearly exceeds not only the 2 sigma high RTP limit of 122.80 but also exceeds the 3 sigma high RTP limit of 136.84% as well.

TABLE 6

Example Result Set 2

| Outcome | # Hits | Pay/hit | Total Paid |
|---|---|---|---|
| Red7-Red7-Red7 | 2 | 200 | 400 |
| White7-White7-White7 | 4 | 50 | 200 |
| Blue7-Blue7-Blue7 | 28 | 15 | 420 |
| Any 7s | 124 | 3 | 372 |
| No Win | 842 | 0 | 0 |
| Totals: | 1,000 | | 1,392 |

An auditing system that simply relies upon total wager, total pay and total game count, would flag this behavior as abnormal. If the auditing system or the casino analyst calculated the probability of natural occurrence, the result would exceed what would be a typical alarm threshold of 3 standard deviations.

Knowing that:

Interval=|Actual Value−Mean Value|=|1139.2%−94.71%|=44.49%

SD=4.4 n=1000

The system uses the equation described earlier, $$\text{Interval}=z*SD/sqrt(n)$$

To solve for z $$z=\text{Interval}*sqrt(n)/SD=3.1975$$

Using a Normal distribution values table found in many statistics books, a z-score of 3.1975 corresponds to the probability of 0.07% this being the result of normal behavior, or in other words, only a 1 in 1428 chance that the actual result indicates normal behavior. This would seem to clearly indicate the possibility of a malfunctioning game and could cause a given casino operator to take an unnecessary and expensive action such as temporarily or permanently disabling the game, or initiating a time-consuming analysis of the game history.

However, by examining more than simply the wagers placed, awards paid and games played in such circumstances, an AFA auditor would more accurately not reject the null hypothesis that the game is exhibiting normal behavior, and thereby not trigger a false alarm.

The reason of course that Data Set 1 appears to be within normal expectations while Data Set 2 is well outside of normal expectations is simply the additional Red7-Red7-Red7 award.

As described earlier, the odds of a Red7-Red7-Red7 outcome on any given game is 1/10648.

The probability, x, of getting exactly two Red7-Red7-Red7 outcomes within 1000 games can be calculated as follows:

$$X=p^{k}*q^{(n-k)}*{}_{n}C_{k}$$

Where p is probability of success=1/10648 q is the probability of failure=10647/10648 n is the total number of outcomes, 1000 k is the number of success outcomes, 2

${}_{n}C_{k}$, which can also be represented as $\binom{n}{k}$, indicates the number of ways that k items can be arranged within n possible positions, which is calculated as n! / ((n−k)!*k!)

Completing the equation yields x=0.40%, which corresponds to a z-score around 2.65 and therefore below the 3 standard deviation threshold. In this particular example, an AFA system would correctly inform a casino operator of an early cycle of the top award and present a more accurate assessment of the nature and likelihood of further losses.

Reduced False Positives w/Multiple Wager Sizes

A more impactful and realistic demonstration of this advantage of an AFA auditing system occurs when variable bet sizes are possible. Most slot games accept a range of bet sizes. At one extreme are 3 reel electro-mechanical slot games that accept a wager of either $1 or $2. Closer to the other end of the spectrum are video slot games that offer a highest to lowest bet ratio of 100× or more. Video slot games offered via an Internet-based online casino, such as provided by WagerWorks—an IGT Company, can have a lowest to highest bet ratio exceeding 1000×. For example, a registered player playing from an authorized jurisdiction can play the WagerWorks' online game, Cleopatra®, for as little as £0.01 a game and for as much as 100 credits*£5 per credit=£5000 credits, which represents a max to min ratio of 500,000×.

Going back to Example Result Set #1, let's say that 900 of the games were played at $1 and 100 were played at $10. Furthermore, let's say that the single Red7-Red7-Red7 award was won by a $10 player. Table 7, Example Result Set 3 (reproduced as FIG. 12) illustrates one such scenario.

TABLE 7

| Example Result Set 3 | | | | | | | |
|---|---|---|---|---|---|---|---|
| Outcome | $1 Bet Hits | $10 Bet Hits | Total Hits | Pay/hit | $1 Bet Pays | $10 Bet Pays | Total Paid |
| Red7-Red7-Red7 | 0 | 1 | 1 | 200x | $0 | $2,000 | $2,000 |
| White7-White7-White7 | 3 | 0 | 4 | 50x | $150 | $0 | $150 |
| Blue7-Blue7-Blue7 | 25 | 3 | 28 | 15x | $375 | $450 | $825 |
| Any 7s | 114 | 10 | 124 | 3x | $342 | $300 | $642 |
| No win | 758 | 86 | 843 | 0x | $0 | $0 | $0 |
| Totals: | 900 | 100 | 1,000 | | $867 | $2,750 | $3,617 |

Total wagers at this point=900 games*$1+100 games*$10=$1900

So the total game RTP is $3617/$1900=190.4% which is vastly beyond even the three sigma high RTP level of 136.84%.

A traditional RTP-based auditing system or process would clearly flag this game as severely malfunctioning. However, as was demonstrated with the equivalent result set presented in Example Set 1, the results from Example Result Set 3 are clearly within normal expectation. This demonstrates how susceptible traditional RTP-based systems are to false positives when only the data monitored are from the hard meters, namely total wagers, total pays and total games played.

A possible solution to this weakness of a given RTP-based auditing systems would be for this system to maintain different statistics for the different bet sizes. While this may be a practical approach for auditing a game with a max to min bet ratio of 2, such an approach becomes impractical and/or inaccurate when games with wider and wider bet variations are audited.

The AFA auditing system, which focuses on the rate of occurrence of events irrespective of the bet size, avoids the inherent difficulties that RTP-based auditing systems have with variable bet sizes.

Earlier Problem Detection—General

In the previous example, we showed how a binomial odds calculation, $$X=p^k*q^{(n-k)}*e_nC_k$$

could be used to more accurately access and describe the situation with example data set 2. This calculation works with very small numbers of hits. Typical statistical tests using in casino gaming, like chi-square testing or confidence interval testing, require a sufficient number of positive samples for the test results to be meaningful. Statistics text books differ on the number of samples required for results to be meaningful; some text books indicate 10 samples is the lowest useful minimum whilst other text books indicate that 20 or 30 samples are necessary.

Whichever sample size an auditing system or analyst decides upon, the corresponding tests are not considered sufficiently trustworthy until a population of events have been collected. This means that other means would be required to identify a problem early prior to there being a sufficient sample size.

One of the advantages of the AFA system is the ability to meaningfully examine behavior at the very start of data collection. Once a sufficient sample size has been collected, the testing methodologies can change accordingly.

For example, for an AFA auditing system with a min sample size=20, the likelihood of normal behavior for award frequency of a given award for the first 19 instances would use:

$$X=p^k*q^{(n-k)}*_nC_k$$

On the 20$^{th}$ occurrence and beyond, a different method would be used such as a binomial distribution confidence interval. Specifically, for situation where there is either success (with probability p) or failure (with probability q), the standard deviation (SD) after n games $$SD=p*q*n$$

We can then determine a z-score using as was done earlier with:

$$z=\text{Interval}*sqrt(n)/SD$$

The z-score can them be used as an auditing threshold and/or can be converted into a probability of normal behavior via table look-up or via other mechanism to obtain the results of the calculation:

$$\text{probability of normal occurrence} = f(z) = -\frac{1}{\sqrt{2\pi}}e^{\frac{z^2}{2}}$$

Earlier Problem Detection—Example

In the gaming industry, it is a standard practice to develop a given game title with multiple paymodel, each paymodel offering a different RTP and/or different volatility experience. A given casino operator chooses certain RTP variations to best match their marketplace and method of operations. Some casino operators may choose to install several slot machines, all of the same title and appearance, but which are based upon two or more different RTP paymodels.

Let's say that a casino operator installed a number of slot machines which were thought to be implementing the game model from example 1. In the previous example, we showed how a binomial odds calculation, $$X=p^k*q^{(n-k)}*_nC_k$$

could be used to more accurately access and describe the situation with example data set 2. This calculation works with very small numbers of hits. Typical statistical tests used in casino gaming, like chi-square testing or confidence interval testing, require a sufficient number of positive samples for the test results to be meaningful. Table 8 below (reproduced as FIG. 13) illustrates paymodel A.

TABLE 8

| Paymodel A | | | |
|---|---|---|---|
| SYMBOLS | Reel 1 | Reel 2 | Reel 3 |
| Red7 | 1 | 1 | 1 |
| White7 | 5 | 3 | 3 |
| Blue7 | 5 | 7 | 7 |
| Blank | 11 | 11 | 11 |
| TOTAL | 22 | 22 | 22 |

Let's also say that due to some error, the incorrect paymodels were loaded onto these machines. So instead of a 94.71% payback, the paymodels on the install machines had the following configuration of Paymodel B shown in Table 9 below (reproduced as FIG. 14).

TABLE 9

| Paymodel B | | | |
|---|---|---|---|
| SYMBOLS | Reel 1 | Reel 2 | Reel 3 |
| Red7 | 1 | 1 | 1 |
| White7 | 7 | 2 | 3 |
| Blue7 | 3 | 8 | 7 |
| Blank | 11 | 11 | 11 |
| TOTAL | 22 | 22 | 22 |

Paymodel B yields an RTP of 82.46%, as seen in Table 10 below (reproduced as FIG. 15).

TABLE 10

| Outcome | Pays | Odds | Prob. | RTP |
|---|---|---|---|---|
| Red7-Red7-Red7 | 200 | 1:10648 | 0.01% | 1.88% |
| White7-White7-White7 | 50 | 42:10648 | 0.39% | 19.72% |
| Blue7-Blue7-Blue7 | 15 | 168:10648 | 1.58% | 23.67% |
| Any 7s | 3 | 1320:10648 | 12.40% | 37.19% |
| No Win | 0 | 9117:10648 | 85.62% | 0.00% |
| | | | 100.00% | 82.46% |

While casino operators are obviously very concerned about a gaming machine that pays out too much, there are also reasons to be concerned about a gaming machine paying out too little. If a given gaming machine has a much lower RTP than other games in that market, the gambling experience will be substantially impaired relative to the other games available. Though the casino will make more per play, on average, from a gaming machine that pays out too little, such a gaming machine will typically get much less play and therefore not generate as much overall profit as an equivalent gaming machine that does offer a competitive gambling experience.

Another reason a casino operator may worry about a gaming machine that pays too little is regulatory limitation. Many gaming jurisdictions define a minimum RTP that all gaming devices must meet or exceed. For example, at one point in time, New Jersey required that all slot games have a payback of at least 83.00%. Paymodel B, with an RTP 82.46%, would be considered an illegal gaming device in a jurisdiction with an 83% minimum RTP requirement.

Figure 16:
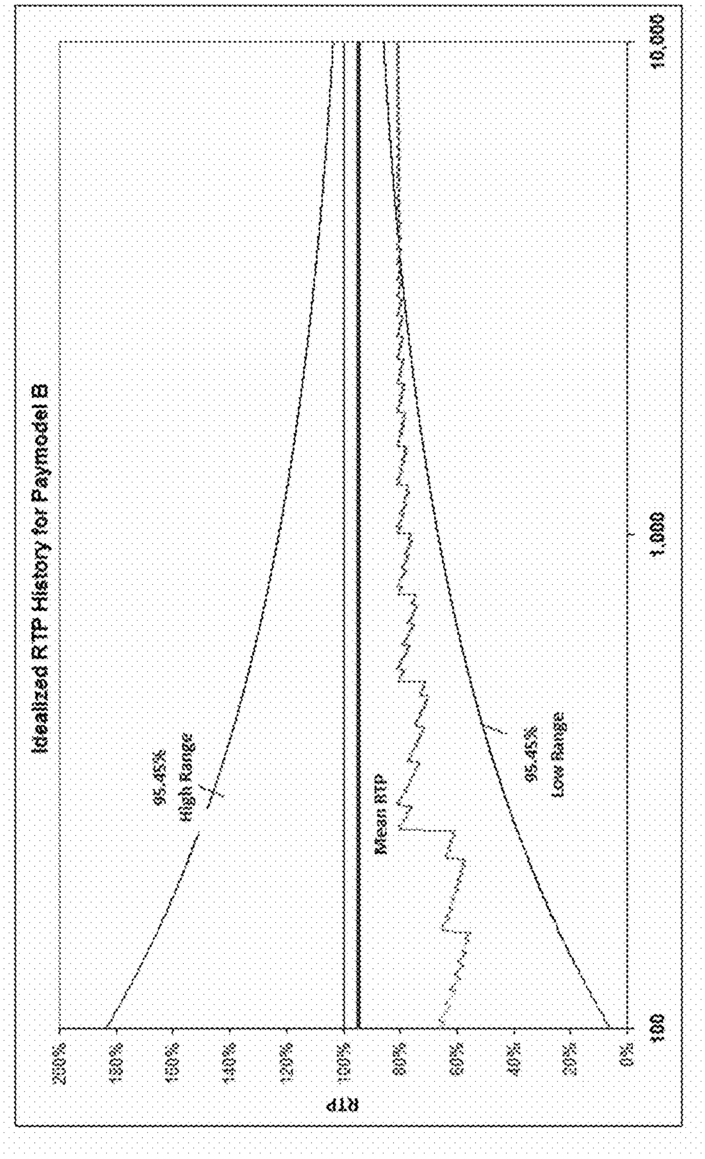

In FIG. 16, an idealized RTP history of play is illustrated for paymodel B.

Specifically, these data reflect each award occurring with exact regularity. The mechanism of the following example holds for any normal RTP history and we represent an idealized one for simplicity and clarity.

The idealized RTP history first crosses the 2 sigma curve around 3500 games and makes it final cross-over around 4100 games. It would only be after these many games that an RTP-based auditing system would identify the problem.

An AFA system according to the present invention would identify the problem much faster than this. In the worst case, the AFA system of the present invention would correctly and definitely report an issue after collecting a relatively small "population" of samples for the errant outcome(s). On average, 20 to 30 Blue7-Blue7-Blue7 would be collected after 1300 to 1900 games. However, even earlier detection is possible and likely based upon the binomial probability test of samples even before a population of samples were collected. Computer simulation of this very example shows that an AFA system using binomial odds can identify within the first 500 to 1000 games, that a game operating under paymodel B is not conforming to paymodel A expectations. The, in this example, an AFA system identifies a problem much sooner than a traditional RTP-based auditing system, thereby significantly limiting the number of games played on the incorrect machines.

While the invention has been particularly shown and described with reference to specific embodiments thereof, it will be understood by those skilled in the art that changes in the form and details of the disclosed embodiments may be made without departing from the spirit or scope of the invention.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. An electronic wager-based gaming control device, comprising:

one or more processors;

one or more memory storage devices;

one or more user input devices; and one or more network interfaces that communicatively couple the gaming control device with one or more electronic gaming machines to enable communication between the gaming control device and the one or more electronic gaming machines;

wherein the gaming control device is configurable by instructions stored in the one or more memory storage devices and operable, when one or more of the instructions are executed by the one or more processors, to cause the gaming control device to:

(a) receive, via the one or more user input devices, an input from a user specifying a threshold level of test sensitivity for one or more of the one or more electronic gaming machines;

(b) receive, via the one or more user input devices, a user input specifying an action to perform, the action to be performed when the threshold level of test sensitivity is met or exceeded; and (c) for each play of one or more consecutive plays of each game of one or more games playing on each of one or more of the one or more electronic gaming machines, said play following receipt of a physical item that indicates a monetary value by an acceptor supported by a housing of said gaming machine, identification of the received physical item by the acceptor of said gaming machine, and establishment of a credit balance based at least in part on the indicated monetary value, said credit balance being increasable by any provided awards and decreasable upon an occurrence of a cashout event:

(i) monitor statistical outcome data for the play;

(ii) record, in the one or more memory storage devices, selected statistical outcome data of the monitored statistical outcome data;

(iii) perform an inter-arrival Award Frequency Analysis on the selected statistical outcome data, wherein the Award Frequency Analysis comprises, for each of a plurality of possible specific awards payable during the play:

(A) detecting a number of plays since said award was awarded; and (B) performing an analysis for said award using the respective detected number of plays for said award;

(iv) compare one or more results of the Award Frequency Analysis relative to the user-specified threshold level of test sensitivity;

(v) determine when the threshold level of test sensitivity has been met or exceeded based on the comparison; and (vi) when the gaming control device determines that the threshold level of test sensitivity has been met or exceeded, perform the received user-specified action.

2. The electronic wager-based gaming control device of claim 1, wherein:

the user-specified threshold level of test sensitivity comprises a confidence level threshold for a confidence interval;

to compare the one or more results of the Award Frequency Analysis relative to the user-specified threshold level of test sensitivity, the gaming control device is configured to compare the one or more results of the Award Frequency Analysis relative to the confidence level threshold; and to determine when the threshold level of test sensitivity has been met or exceeded, the gaming control device is configured to determine when the confidence level threshold has been met or exceeded.

3. The electronic wager-based gaming control device of claim 2, wherein the user-specified confidence level threshold for the confidence interval comprises a z-score.

4. The electronic wager-based gaming control device of claim 2, wherein the user-specified confidence level threshold for the confidence interval comprises a probability of natural occurrence.

5. The electronic wager-based gaming control device of claim 2, wherein the user-specified confidence level threshold for the confidence interval comprises a probability of not being a natural occurrence.

6. The electronic wager-based gaming control device of claim 2, wherein the gaming control device is further configured to determine when a probability of normal behavior has been met or exceeded based on the comparison of the one or more results of the Award Frequency Analysis relative to the user-specified threshold level of test sensitivity.

7. The electronic wager-based gaming control device of claim 6, wherein to determine when the probability of normal behavior has been met or exceeded, the gaming control device is configured to determine the normal behavior via two or more testing methods.

8. The electronic wager-based gaming control device of claim 7, wherein the gaming control device is configured to select the two or more testing methods based at least in part on a number of occurrences of an outcome.

9. The electronic wager-based gaming control device of claim 7, wherein the user-specified test threshold sensitivity is specified as a single indicator specifying a level of a sensitivity scale and wherein the single indicator is translated into two or more threshold levels for the two or more testing methods, respectively.

10. The electronic wager-based gaming control device of claim 1, wherein:

the user-specified threshold level of test sensitivity comprises a chi-squared test threshold limit;

to compare the one or more results of the Award Frequency Analysis relative to the user-specified threshold level of test sensitivity, the gaming control device is configured to compare the one or more results of the Award Frequency Analysis relative to the chi-squared test threshold limit; and to determine when the threshold level of test sensitivity has been met or exceeded, the gaming control device is configured to determine when the chi-squared test threshold limit has been met or exceeded.

11. The electronic wager-based gaming control device of claim 1, wherein:

the user-specified threshold level of test sensitivity comprises a t-test threshold limit;

to compare the one or more results of the Award Frequency Analysis relative to the user-specified threshold level of test sensitivity, the gaming control device is configured to compare the one or more results of the Award Frequency Analysis relative to the t-test threshold limit; and to determine when the threshold level of test sensitivity has been met or exceeded, the gaming control device is configured to determine when the t-test threshold limit has been met or exceeded.

12. The electronic wager-based gaming control device of claim 1, wherein the user-specified action comprises disabling all new play of one or more games at one or more of the one or more electronic gaming machines.

13. The electronic wager-based gaming control device of claim 1, wherein the user-specified action comprises disabling one or more current plays of one or more games at one or more of the electronic gaming machines at which the threshold level of test sensitivity has been met or exceeded.

14. The electronic wager-based gaming control device of claim 1, wherein the user-specified action comprises disallowing play by an identified player at any and all of the one or more electronic gaming machines, wherein the identified player is identified through a player tracking system at one of the electronic gaming machines at which the threshold level of test sensitivity has been met or exceeded.

15. The electronic wager-based gaming control device of claim 1, wherein the user-specified action comprises generating and sending an email to a specified entity that indicates that the threshold level of test sensitivity has been met or exceeded, the email comprising one or both of:

an identity of the player playing on the electronic gaming machine when the threshold level of test sensitivity was met or exceeded when available; and an amount by which the threshold was exceeded.

16. The electronic wager-based gaming control device of claim 1, wherein the user-specified action comprises paging a specified entity and sending an indication to the specified entity that indicates that the threshold level of test sensitivity has been met or exceeded, the indication comprising an amount by which the threshold was exceeded.

17. The electronic wager-based gaming control device of claim 1, wherein the gaming control device is further configured to:

receive an input from the user specifying a group of award variables to be analyzed;

receive an input from the user specifying an alarm setting for selected ones of the award variables, the alarm setting comprising a multi-part condition for tripping the alarm, the multi-part condition specifying at least a first condition for a first one of the award variables and a second condition for a second one of the award variables;

compare the one or more results of the Award Frequency Analysis to the alarm setting and determine if each of the conditions of the multi-part analysis is met based on the comparison; and when the gaming control device determines that each of the conditions of the multi-part analysis has been met, indicate an alarm condition to the user or to another casino system.

18. The electronic wager-based gaming control device of claim 17, wherein the gaming control device is further configured to receive an input from the user specifying one or more of:

a weighting of the first award variable relative to a baseline;

a weighting of the first award variable relative to a second variable;

a weighting of the first condition relative to another baseline; or a weighting of the first condition relative to a second condition.

19. The electronic wager-based gaming control device of claim 18, wherein one of the award variables relates to an individual paytable award frequency.

20. The electronic wager-based gaming control device of claim 1, wherein the threshold level of test sensitivity is exceeded when a magnitude of one of one or more results of the Award Frequency Analysis is greater than a magnitude of the threshold level of test sensitivity.

21. An electronic wager-based gaming system comprising:

a plurality of electronic wager-based gaming machines each including:

a housing, a display device supported by the housing, an acceptor supported by the housing, at least one input device supported by the housing, a processor, and a memory device;

a network interconnecting the plurality of electronic wager-based gaming machines;

an auditing device comprising:

one or more processors;

one or more memory storage devices; and one or more network interfaces that communicatively couple the auditing device with the network and with the plurality of gaming machines;

wherein the memory storage devices comprise one or more instructions that when executed by the one or more processors are operable to cause the auditing device to:

(a) receive an input from a user specifying a group of award variables for which an Award Frequency Analysis is to be performed;

(b) receive an input from the user specifying one or more alarm settings for selected ones of the award variables, each alarm setting comprising a multi-part condition for tripping an alarm associated with the respective alarm setting, the multi-part condition specifying at least a first condition for a first one of the award variables and a second condition for a second one of the award variables; and (c) for each play of one or more consecutive plays of each game of one or more games playing on each of one or more of the one or more electronic gaming machines, said play following receipt of a physical item that indicates a monetary value by the acceptor of said gaming machine, identification of the received physical item by the acceptor of said gaming machine, and establishment of a credit balance based at least in part on the indicated monetary value, said credit balance being increasable by any provided awards and decreasable upon an occurrence of a cashout event:

(i) perform the Award Frequency Analysis on one or more of the group of award variables, wherein, for each of the award variables on which the Award Frequency Analysis is to be performed, the Award Frequency Analysis comprises:

(A) determining a number of plays since an award associated with the award variable has been awarded; and (B) performing an analysis for the award using the respective detected number of plays for that award;

(ii) compare the results of the Award Frequency Analysis to one or more of the alarm settings;

(iii) determine when any of the multi-part conditions are met or exceeded based on the comparison; and (iv) when it is determined that any of the multi-part conditions have been met or exceeded, indicate an alarm condition to the user or another casino system.

22. An electronic wager-based gaming control device comprising:

one or more processors;

one or more memory storage devices;

one or more user input devices; and one or more network interfaces that communicatively couple the gaming control device with one or more electronic gaming machines to enable communication between the gaming control device and the one or more electronic gaming machines;

wherein the gaming control device is configurable by instructions stored in the one or more memory storage devices and operable, when one or more of the instructions are executed by the one or more processors, to cause the gaming control device to:

for each play of one or more consecutive plays of each game of one or more games playing on each of one or more of the one or more electronic gaming machines, said play following receipt of a physical item that indicates a monetary value by an acceptor supported by a housing of said gaming machine, identification of the received physical item by the acceptor of said gaming machine, and establishment of a credit balance based at least in part on the indicated monetary value, said credit balance being increasable by any provided awards and decreasable upon an occurrence of a cashout event:

(a) monitor statistical data related to Return to Player for the play;

(b) record, in the one or more memory storage devices, selected Return to Player statistical data of the monitored statistical data, including a Return to Player for each of the one or more monitored electronic gaming machines;

(c) employ an auditing paymodel in an Award Frequency Analysis;

(d) perform the Award Frequency Analysis utilizing the selected Return to Player statistical data, wherein the Award Frequency Analysis comprises, for each of a plurality of possible specific awards payable during play:

(i) detecting a number of plays since said award was awarded; and (ii) performing an analysis for said award using the respective detected number of plays for said award; and (e) determine when a paymodel for a game running on any of the electronic gaming machines is different than the auditing paymodel.

* * * * *